Inventors:
Robert S. Brace
Edward L. Robinson, Jr.

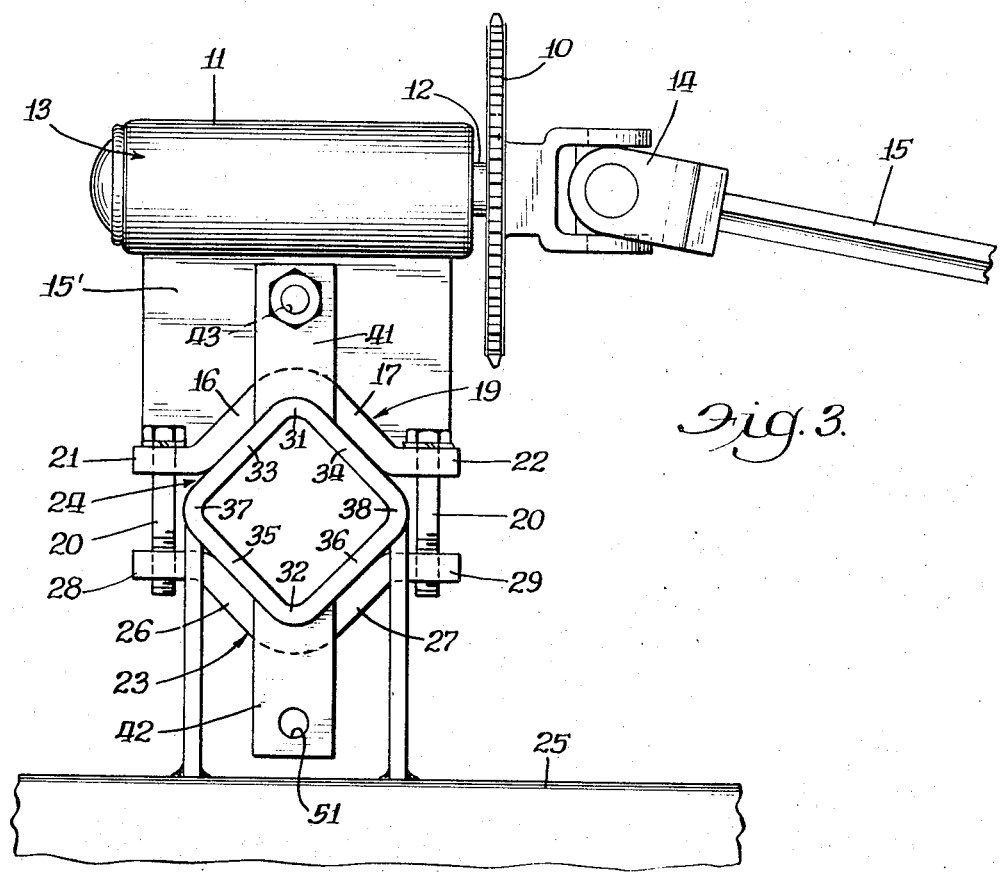
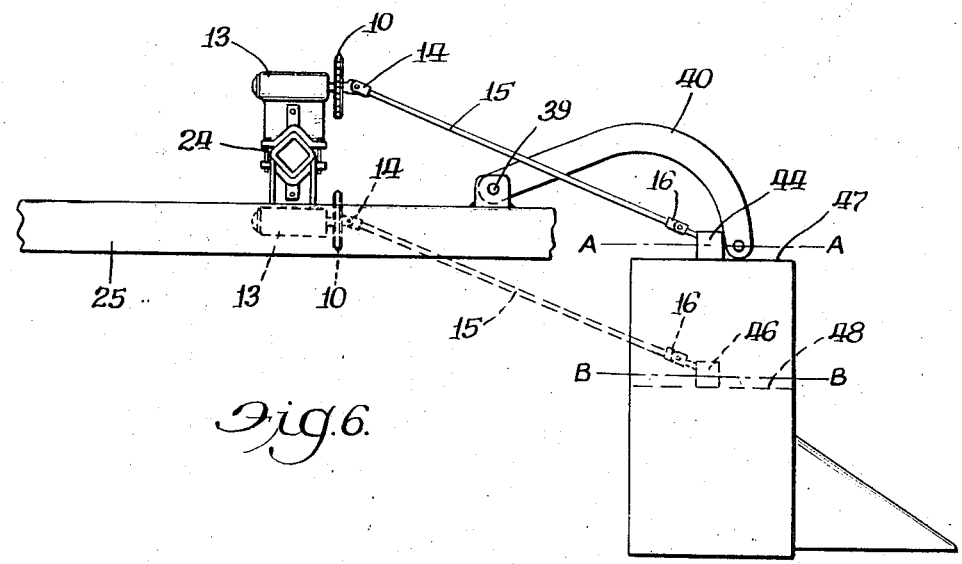

Sept. 15, 1970   R. S. BRACE ET AL   3,528,229
COTTON PICKER DRIVE THEREOF

Filed March 7, 1968   3 Sheets-Sheet 3

Inventors:
Robert S. Brace
Edward L. Robinson, Jr.

By John J. Kowalik
Atty.

United States Patent Office 3,528,229
Patented Sept. 15, 1970

3,528,229
COTTON PICKER DRIVE THEREOF
Robert S. Brace and Edward L. Robinson, Jr., Memphis, Tenn., assignors to International Harvester Company, Chicago, Ill., a corporation of Delaware
Filed Mar. 7, 1968, Ser. No. 711,381
Int. Cl. A01d 45/18
U.S. Cl. 56—11                                10 Claims

ABSTRACT OF THE DISCLOSURE

A cotton picker having several different picker drums; a power transfer mechanism so structured that several different sized picker drums are accommodated by the same mechanism merely by transposing the position and reassembling the components of the power transfer mechanism frame member while retaining a range of optimum angular drive relationships and operational requisites in the several positions.

BACKGROUND OF THE INVENTION

It is well known that the requirements for harvesting cotton will vary from region to region depending upon the climatic, soil and other conditions.

In order to accommodate these crop differences cotton pickers are usually manufactured with either 14 spindle picker drums or 20 spindle picker drums, normally referred to as low and high drums, respectively.

Power is provided to the picker drum from a prime mover through a series of drive pulleys, belts and other transmission devices to a main drum drive gear case. In the instant invention power is then divided and delivered to a transfer mechanism which incorporates a sprocket and chain system and a journaled sprocket driving shaft which connects to a drive mechanism of the picker drum. The drive shaft from the driving shaft requires the use of universal joints on each end to accommodate up and down movements of the picker drum as it proceeds along the terrain.

In cotton pickers of current construction the picker drums are mounted in the forward portion of the machine and capable of up and down motion needed to maintain a constant relative position to the cotton plants during picking. The drums may be raised to transport position and since at times power is delivered to them, as well as during picking, it is imperative that the displacement angles of the universal joints be maintained at an optimum value necessary to ensure delivery of power with as near constant angular velocity as possible to the picker drum, regardless of drum size used or relative position of drum and mounting position of transfer mechanism. Therefore the major problem is the inherent inflexibility in the structure of the transfer mechanism which mounts to the support structure of the cotton picker in such a manner that both the low and high drum variations cannot be accommodated without the use of different components and if the same components are used the drive is compromised and its functionality is limited.

A general object of the invention is to provide a novel means by which the transfer mechanism can be embodied in the cotton picker driving arrangement and so oriented on the support structure of the picker whereby a repositioning and reassembling of the same components in different arrangements both the high and low picker drum can be effectively driven.

In extension of the foregoing object, it is contemplated to provide a drive train for low and high picker drums in which minimum displacement angles of the universal joint utilized in such drive train is obtained regardless of drum position.

A still further object of the invention is to provide a transfer mechanism incorporating a novel mounting disposing the parts in self aligning position in both the upright or inverted position.

Figure 1:
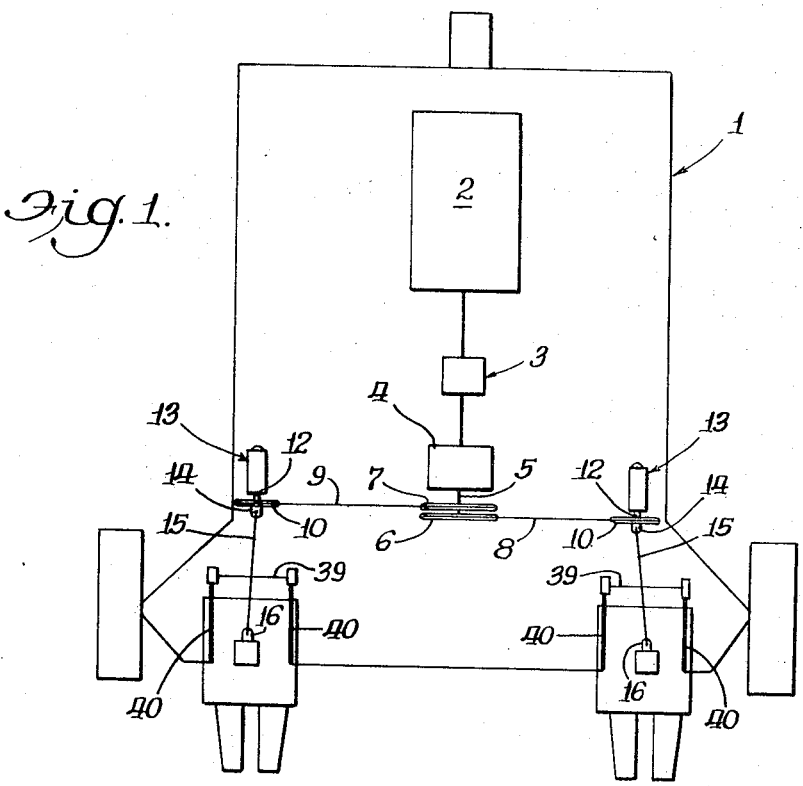
Figure 2:
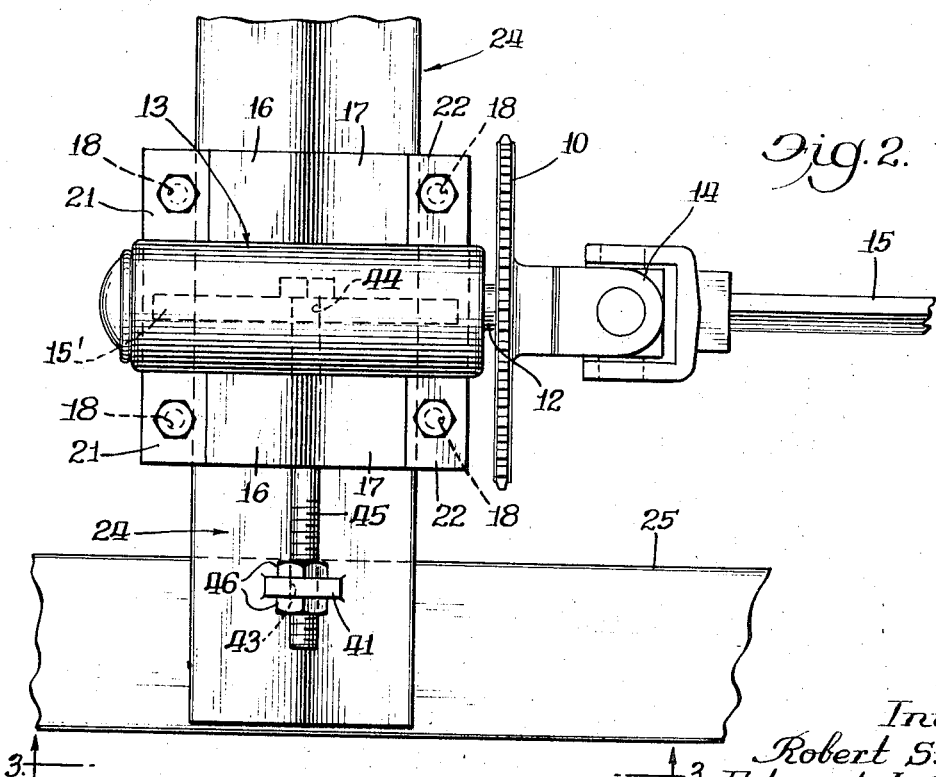
Figure 4:
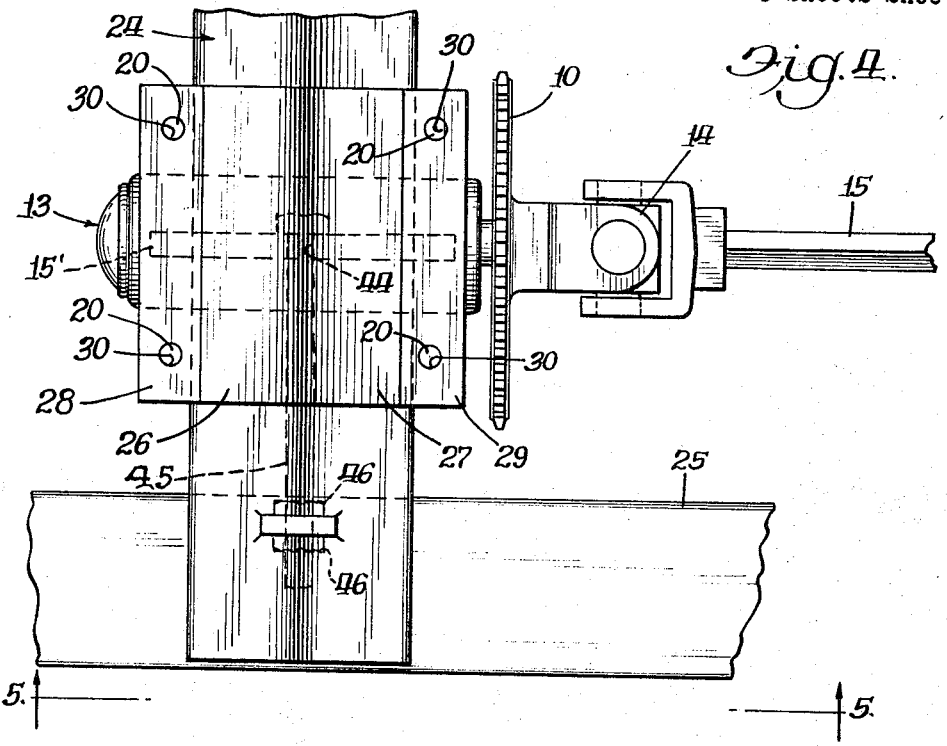
Figure 5:
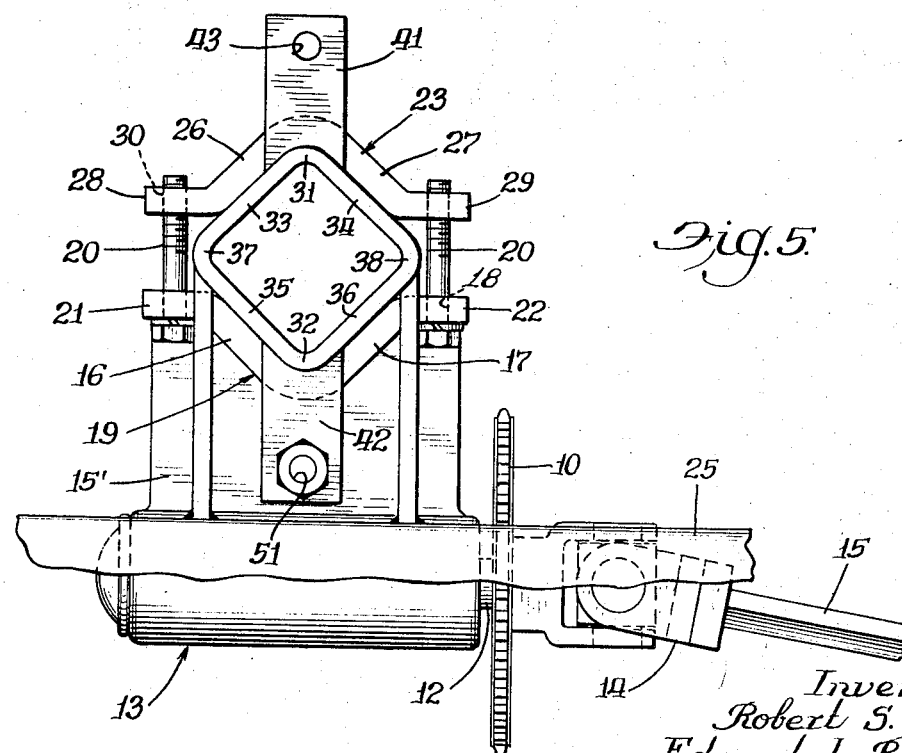

These and other objects and advantages inherent in and encompassed by the invention will become more readily apparent from the specification and the drawings wherein:

FIG. 1 is a plan diagrammatic view showing the driving arrangement for various components associated with the cotton picker drums;

FIG. 2 is a plan view of a portion of the power transfer system to the picker drums with parts broken away and showing the invention applied thereto; and FIG. 3 is an elevational view taken substantially on the line 3—3 of FIG. 2; and FIG. 4 is a plan view of a portion of the power transfer system to the picker drums with parts broken away and showing the invention applied thereto in transposed position; and FIG. 5 is an elevational view taken substantially on the line 5—5 of FIG. 4; and FIG. 6 is a diagrammatic elevational view of the power transfer system in relation to the picker drum in both the upright and transposed position and showing the invention applied thereto.

Describing the invention in detail and having particular reference to the drawing there is shown (FIG. 1) a diagrammatic representation of a self propelled cotton harvester generally designated 1, which comprises an engine 2, which is coupled to a power train diagrammatically represented 3 and which delivers power to the main drum drive gear case 4. The output shaft 5 of gear case 4 is connected to suitably spaced sprockets 6 and 7 which drive the sprocket drive chains 8 and 9 which are trained about transfer sprockets 10, respectively.

It should be noted that the right and left hand power trains to the picker drums and their associated members and components are substantially identical. Therefore, for clarity the same designations will be assigned to components on each side and the corresponding description will apply to both the right and left portions of the harvester incorporating the invention.

The sprocket 10 is concentrically connected to shaft 12 which is journaled in a power transfer support structure, generally designated 13. One end of universal joint 14 is connected and co-axially disposed about the portion of shaft 12 protruding through sprocket 10. The opposite end of universal joint 14 is connected to driving shaft 15 which inclines downwardly and forwardly and is connected to universal joint 16 which is optionally connected to an input shaft of picker drum right angle drive 44 located on top of high profile picker drum housing 47, or drive 46 located on top of low profile picker drum 48 (see FIG. 6).

The power required for both the high and low profile picker drum arrangement, which employ the 14 and 20 spindle high picker drum respectively, is transferred from drum drive 4 into shaft 5 to sprockets 6 and 7 which drive chains 8 and 9 delivering power to sprockets 10, 10 respectively. The power from sprocket 10 is transmitted to universal joint 14 and from there to shaft 15, to universal 16 and into gear box 44, when high drums are employed, which ultimately delivers said power to the 20 spindle picker drums contained in housing 47; or for low drum arrangement power is delivered from universal 16 into gear box 46 which ultimately delivers said power to the 14 spindle picker drums contained in housing 48.

A critical portion of the above described power train centers about the disposition of the transfer mechanism 13, and its location relative to the high drums and to the low drums so as to effectively deliver power to the low drums as well as to the high drums without the necessity for substituting parts.

The unique mounting and positional disposition of transfer mechanism 13 in upright position for high drum employment is best seen in FIGS. 2 and 3. Transfer mechanism 13 comprises a tubular enclosure 11 intergrated with one end of a stand off block 15' the other end of which merges with the apex and the diverging side webs 16, 17 of V-shaped mounting bracket, generally designated 19, the apex of which is disposed transversely of the related shaft 12. The side webs 16, 17 of bracket 19 terminate at their free ends in coplanar flanges 21, 22, each having a plurality of appropriate openings 18 for bolts 20 which serve to clamp V-shaped bracket 23 about a complementary diamond shaped frame element 24 of the harvester frame structure 25.

Complementary clamp 23 has side webs 26, 27 terminating in coplanar flanges 28, 29 each having a plurality of appropriately threaded openings 30 which are so arranged that when mounting bracket 19 and clamp 23 are placed about the frame member 24 both bracket 19 and clamp 23 with their respective openings 18 and 30 will align allowing bolts 20 to pass through openings 18 and be threaded into openings 30 thereby drawing 19 and 23 together securely then about said member 24.

In the cotton harvester employing high drum (20 spindle) pickers the transfer mechanism 13 is placed on the top of quadrilateral member 24 which has upper and lower apices 31, 32 located in a common vertical plane and upper walls 33, 34 diverging downward from upper apex 31 and having similar lower walls 35, 36 diverging upward from apex 32, and said walls 34, 36 merge at apex 38 and walls 33, 35 merge at apex 37 and where apices 37, 38 are located in a common and substantially horizontal plane thereby forming diamond shaped member 24; said member being disposed at the forward end of the harvester just aft the coaxial rock shafts 39 of the picker drum lifter arms 40 (FIG. 1, FIG. 6). With bracket 19 disposed in this upper position, as best seen in FIG. 3, side webs 16 and 17 of said bracket 19 and walls 33, 34 of member 24 respectively match and complement each other resulting in a self-aligning snug fit. Likewise side webs 26 and 27 of clamp 23 disposed on the lower walls 35 and 36 of member 24 respectively will result in a similar fit. When the two brackets 19 and 23 are so arranged their respective flanges 21, 22 and 28, 29 will be sufficiently spaced to allow proper clamping action heretofore described.

To facilitate optuimum tension adjustment of driving chains 8, 9 and to maintain thereafter proper adjustment, element 24 is provided with lugs 41, 42 which are disposed on the outer portion of member 24 and connected to and about the upper and lower apices 31 and 32 respectively, and said appendages 41, 42 disposed in a common vertical plane which transverses the member 24. With harvesters employing 20 spindle drums adjustment is made with bracket 19 and 23 clamped about member 24 in the upright position heretofore described, but not tightened sufficiently to substantially inhibit its movement along element 24. Lug 41 is provided with an opening 43 so arranged and aligned with a similar transverse opening 44 in stand off block 15' intermediate its end as to admit a threaded member 45 therethrough and the bolt 45 has threaded thereon at its ends nuts 46 which being appropriately tightened spread the sprocket assembly 10 along member 24 and thereby tightening driving chains 8, 9 to optimum tension. Now bolts 20 are tightened securely clamping transfer mechanism 13 to member 24.

In cotton harvesters of current construction the picker drums are located in the forward portion of the harvester with the power transfer mechanism immediately aft. Intermediate the drum housing and the transfer mechanism is located a lifting mechanism which comprise a rock shaft 39 and lifter arms 40 and associated mechanism whose function it is to raise the picker drum housing to transport position as well as providing up and down motion necessary to maintain proper relative positioning to the cotton plants for optimum picking.

When 20 spindle pickers are used to high drum housing 47 and its associated power train, as best seen in FIG. 6, is so arranged that driving shaft 15 inclines downwardly and is transversely positioned above rock shaft 39. It is imperative, therefore, member 24 be so transversely disposed to longitudinal frame work 25 and driving shaft 15 and at such elevation that transfer mechanism 13 can be positioned on said member 24 that adequate clearance between shaft 15 and 39, and the requisite minimum displacement angles for optimum power transfer between driving shaft 15 and universal joints 14, 16 are at all times realized regardless of the varying position of the drum housing 47.

Currently, cotton harvesters employ transfer mechanisms which are inherently inflexible in their mounting structure that the transfer mechanism used for the 20 spindle picker model cannot serve in the 14 spindle picker model and still maintain the requisite shaft clearances and displacement angles in the drive train without an entire re-structuring positioning and aligning of the entire system on the harvester framework necessitating the incorporation of different components into the system.

The novel feature of the invention is that the mounting system of the transfer mechanism is so structured as to be completely adaptable to both the high drum 20 spindle picker and the low drum 14 spindle picker so that either arrangement can be accommodated simply by transposing the identical components about the same harvester frame member 24, and whereby in either position said tractor mechanism will be self aligning and positionally disposed about said frame member and that adequate shaft clearance between rock shaft 39 and driving shaft 15 will result, along with the retaining of minimum displacement angles between shaft 15 and universal joints 14, 16 to thereby obtain an optimum drive alignment.

Referring to FIGS. 4, 5, the transfer mechanism 13 is placed in the transposed position required for low drum models. Side webs 16, 17 of bracket 19 are disposed about matching and complementary lower walls 35, 36 of frame member 24 respectively. In like manner side webs 26, 27 of clamp 23 are placed upon upper walls 33, 34 of member 24 respectively resulting in a similar complementary matching of components. Here, as in the upright position, flanges 21, 22 of bracket 19 and 28, 29 of clamp 23 will be sufficiently spaced and aligned to allow bolts 20 to draw 19 and 23 together thereby clamping them to member 24 as heretofore described.

Lug 42 disposed on the outer portion of member 24 heretofore described is provided with an opening 51 so arranged and aligned with the simliar transverse opening 44 in stand off block 15' as to admit a threaded member 45 therethrough and by appropriately threading nuts 46 sprocket assembly 10 is spread along member 24 thereby tightening driving chains 8, 9 as required for optimum tension.

It is readily seen in FIG. 6 that line A—A passing through the center of drum drive 44 of the 20 spindle pickers is 9¾ inches above a similar line B—B passing through the center of drum drive 46 of the 14 spindle pickers. This difference between high and low drum application is compensated for by a similar displacement when transfer mechanism 13 is transposed from the upper to lower position. It should be noted that even though driving shaft 15 inclines downwardly and transverses under rock shaft 39, adequate clearances between the shafts 15 and 39 and optimum displacement angles between shaft 15 and universals 14, 16 are maintained regardless of the up and down motions of low drum housing 48.

It has been found in actual on the preferred embodiment herein disclosed that for both high and low drum arrangement the driving shaft angles downwardly from the horizontal at an average universal joint angle of about 13°. Tests have also shown that for normal field conditions, where the picker drums require maximum power, the driving shaft 15 is considered operating in a range of optimum angular drive relationship when maximum vertical picker displacement will not deviate universal joint angles of shaft 15 beyond a tolerable range which in the example shown has been limited to approximately 10° to 16° from coaxial alignment of the output shaft of the transfer mechanism and the input shaft of the drum drive. It should be noted that maintaining this range of optimum angular drive relationship heretofore described is of prime importance, for it assures that the power delivered to the drums is conveyed at a substantially constant angular velocity. This constant angular power requirement is essential in order to assure that deleterious motions of translation are not produced between the picker drums and the cotton plants so that cotton picking spindels of the drum are neither raked or dragged across the plants thereby injuring them or stripping off the immature bolls.

It has been found that the instant invention provides a method of mounting an intermediate power transfer mechanism to the framework of the cotton harvester and being novel in that the mounting is self aligning, can serve both high and low picker drums by rearranging the same parts about the harvester framework, provides a simple and practical method of drive chain tension adjustment, and so disposed that regardless of picker drum size used minimum displacement angles between the universal joints and driving shaft are obtained resulting in optimum power transfer characteristics.

Having described the preferred form of the invention it will be readily apparent that various other embodiments of the invention will become obvious within the scope of the foregoing disclosure and within the scope of the appended claims.

What is claimed is:

1. In a cotton harvester having a frame including a supporting member, cotton harvesting means comprising a cotton harvesting unit of the high profile type mounted on said frame, power transfer means supported on said member and comprising a drive element for receiving power from an associated power source, means for connecting said drive element to said harvesting unit to drive the harvesting elements therein, said power transfer means removably mounted on said support member so that it may be repositioned thereon and secured thereto in order to drive the harvesting elements of a low profile type of harvesting unit which are selectively mountable in the place of the high profile type wherein there is provided a proper relationship between the drive element and each harvesting unit.

2. The invention according to claim 1 wherein said high profile harvesting unit being disposed forwardly on said harvester, and said power transfer means mounted in an upright position on said support member in a substantially aft aligning relationship to said harvesting unit.

3. The invention according to claim 2 wherein said frame member is disposed to locate the drive element of the power transfer means upwardly and rearwardly of the input to said harvesting unit, and said power transfer means being mountable on said support member in an inverted position thereon wherein the relative position of the drive element of the power transfer means in the inverted position is substantially the same for the low profile harvesting unit which would have been substituted for the high profile harvesting unit thereby maintaining an essentially same drive relationship to each of the harvesting units.

4. The invention according to claim 3 wherein said power transfer means comprising a housing, a clamp portion integral with said housing, and a clamp part operative to be releasably secured to said clamp portion with the supporting member therebetween to thereby secure the power transfer means in the upright and inverted positions.

5. The invention according to claim 4 wherein said means for connecting said drive elements to said harvesting unit comprises an extensible articulated driveshaft having one end thereof operatively connected to said harvesting unit, and said drive element of the power transfer means including a shaft journaled in said housing, means mounted on said shaft operatively connected to said associated power source to effectively drive said shaft, and said shaft receivable of the other end of said articulated driveshaft.

6. In a cotton harvester having a frame including a supporting member, cotton harvesting means comprising a cotton harvesting unit of the low profile type mounted on said frame, power transfer means supported on said member and comprising a drive element for receiving power from an associated power source, means for connecting said drive element to said harvesting unit to drive the harvesting elements therein, said power transfer means removably mounted on said support member so that it may be repositioned thereon and secured thereto in order to drive the harvesting elements of a high profile type of harvesting unit which are selectively mountable in the place of the low profile type wherein there is provided a proper relationship between the drive element of each harvesting unit.

7. The invention according to claim 6 wherein said low profile harvesting unit being disposed forwardly on said harvester, said power transfer means mounted on said frame member in an underposed position thereon in a substantially aft aligning relationship to said harvesting unit.

8. The invention according to claim 7 wherein said frame member is disposed to locate the drive element of the power transfer means upwardly and rearwardly of the input to the low profile harvesting unit, and said power transfer means being mountable in a superposed position on said support member wherein the relative position of the drive element of the power transfer means in the superposed position is substantially the same for the high profile harvesting unit which would have been substituted for the low profile harvesting unit thereby maintaining an essentially same drive relationship to each of the harvesting units.

9. The invention according to claim 8 wherein said power transfer means comprising a housing, a releasable clamp assembly having one part connected to said housing and another part releasably securable to said first part with said supporting member therebetween to thereby selectively secure the power transfer means in each of the superposed and underposed positions.

10. The invention according to claim 9 wherein said drive element of said power transfer means comprising a shaft journaled in said housing, means mounted on said shaft and operatively connected to said power source effective to drive said shaft, and said shaft operative to receive said means for connecting said drive element to said harvesting unit, said connecting means comprising an extensible articulated driveshaft.

References Cited

UNITED STATES PATENTS

| | | | |
|---|---|---|---|
| 999,714 | 8/1911 | Gray | 56—41 |
| 2,520,927 | 9/1950 | Hagen | 56—11 |
| 2,660,852 | 12/1953 | Paradise | 56—47 |
| 3,176,451 | 4/1965 | Hubbard | 56—14 |

RUSSELL R. KINSEY, Primary Examiner